H. BROOKE.
PROCESS FOR THE MANUFACTURE OF GLASS SHADES.
No. 191,224. Patented May 29, 1877.
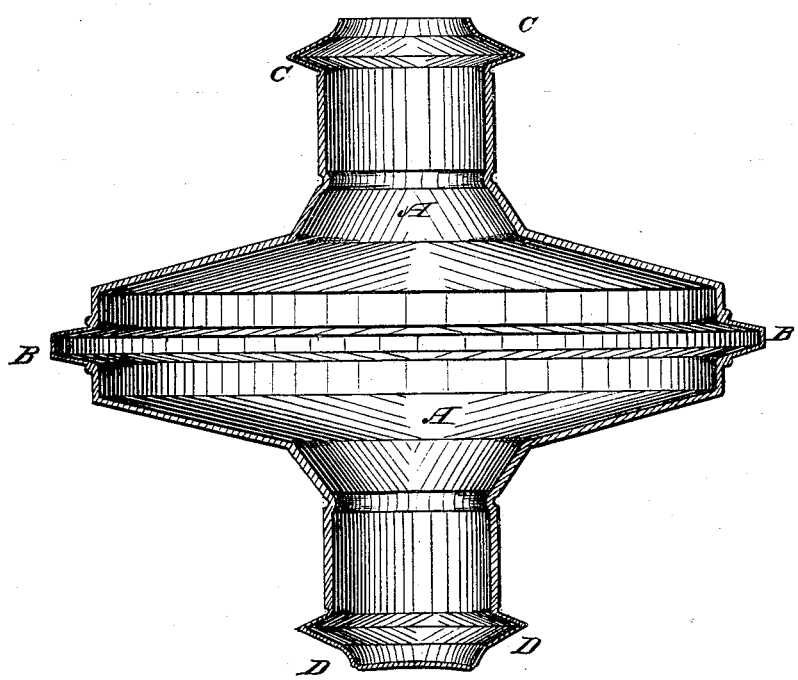

UNITED STATES PATENT OFFICE.

HOMER BROOKE, OF BROOKLYN, NEW YORK, ASSIGNOR TO BENNETT B. SCHNEIDER, OF NEW YORK CITY.

IMPROVEMENT IN PROCESSES FOR THE MANUFACTURE OF GLASS SHADES.

Specification forming part of Letters Patent No. 191,224, dated May 29, 1877; application filed January 23, 1877.

*To all whom it may concern:*

Be it known that I, HOMER BROOKE, of Brooklyn, in the county of Kings and State of New York, have invented certain new and useful Improvements in the Process for the Manufacture of Shades; and I do hereby declare that the following is a full, clear, and exact description thereof, which will enable others skilled in the art to which it appertains to make and use the same, reference being had to the accompanying drawing, and to the letters of reference marked thereon, which form a part of this specification.

My invention relates to the process for the manufacture of shades and globes; and it consists in molding the same in pairs in reverse form, bringing the two extended parts together, and having a blow-over in the center and at each end, as will be hereinafter more fully set forth.

The annexed drawing represents a central vertical section of two shades as they appear after being molded and before they are separated.

In making shades, in blowing the same into a mold, where a single shade is blown, it is necessary that the blow-over covers the entire bottom, so that the air is confined, in order to expand the material to the sides of the mold, and, when taken from the mold, this material must necessarily be broken and wasted. The blow-over is also necessary in order to produce the thin edge required on the outer expanded part, which also necessitates a waste of material.

By my improved process these and other objections are entirely obviated.

I mold the shades in pairs, in reverse form, in compound molds, constructed with a blow-over in the center and at the top and bottom. This compound mold is composed of two bottom molds and two top molds. The bottom molds have a cylindrical opening in the center, and an enlarged concavity surrounding the same in the top, while the upper molds are reversed, so as to bring the edges of the enlarged concavities together.

In molding the shades the bottom molds are closed and the top molds opened. The operator then takes his glass and blows it into the form of a half-completed globe, which is placed and pressed down in the concavity of the bottom molds. The upper molds are then also closed and the blowing completed, when two shades, A A, will be formed of one piece, in reverse form, with a blow-over, B, at the junction of the extended parts of the two shades; also a blow-over, C, at the top, and a blow-over, D, at the bottom, this latter blow-over closing the end of the cylinder of the bottom shade.

By this process two very important advantages are gained: First, by blowing two shades in reversed form into a mold, and leaving the blow-over B between the two expanded parts, for the purpose of separation, the two shades can be separated by a slight jar or otherwise, leaving the outer edge as required, and with little or no waste to be broken off in the blow-over, thus saving material; and, secondly, two shades can be produced by this process as quickly as one, thus making a saving in time, and using about the same quantity of material in making the two as heretofore used in making one.

Having thus fully described my invention, what I claim as new, and desire to secure by Letters Patent, is—

An improvement in the process of manufacturing shades and globes by molding the same in pairs in reverse form, bringing the two extended parts together, and having a blow-over in the center and at each end, substantially as herein set forth.

In testimony that I claim the foregoing as my own I affix my signature in presence of two witnesses.

HOMER BROOKE.

Witnesses:
C. N. BOON, Jr.,
JOSHUA M. FIERO.